United States Patent
Rajkhowa et al.

(10) Patent No.: US 12,277,529 B2
(45) Date of Patent: Apr. 15, 2025

(54) SYSTEMS AND METHODS FOR RUSH ORDER FULFILMENT OPTIMIZATION

(71) Applicant: Walmart Apollo, LLC, Bentonville, AR (US)

(72) Inventors: Pratosh D. Rajkhowa, Sunnyvale, CA (US); Vidyanand Krishnan, Sunnyvale, CA (US); Ameya Ajay Shendre, Bangalore (IN); Shekhar Gupta, Bengaluru (IN); Pavan Kumar, Bangalore (IN); Rohit Jain, Sunnyvale, CA (US); Deepak R. Deshpande, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/378,026

(22) Filed: Oct. 9, 2023

(65) Prior Publication Data
US 2024/0037500 A1    Feb. 1, 2024

Related U.S. Application Data

(63) Continuation of application No. 17/384,017, filed on Jul. 23, 2021, now Pat. No. 11,783,288, which is a
(Continued)

(30) Foreign Application Priority Data

Feb. 26, 2018    (IN) .............................. 201811007225

(51) Int. Cl.
G06Q 10/087    (2023.01)
B65D 79/02     (2006.01)
(Continued)

(52) U.S. Cl.
CPC ........... *G06Q 10/087* (2013.01); *B65D 79/02* (2013.01); *G06Q 10/063114* (2013.01);
(Continued)

(58) Field of Classification Search
CPC ......... G06Q 10/087; G06Q 10/063114; G06Q 10/06312; G06Q 10/06316; B65D 79/02; G06K 7/10366
See application file for complete search history.

(56) References Cited

U.S. PATENT DOCUMENTS 5,111,391 A * 5/1992 Fields ............ G06Q 10/063112
                                            705/7.14
5,524,077 A * 6/1996 Faaland .......... G06Q 10/06312
                                            705/7.22
(Continued)

FOREIGN PATENT DOCUMENTS

GB    2585574 A       1/2021
WO    2019165416     8/2019

OTHER PUBLICATIONS

Das Neves Salgado, Tiago, Miguel Ferreira. (2015). In-store order picking routing: A biased random-key genetic algorithm approach (Order No. 30953222). Available from ProQuest Dissertations & Theses Global. (3039730867). (Year: 2015).*
(Continued)

*Primary Examiner* — Ashford S Hayles
(74) *Attorney, Agent, or Firm* — Fitch, Even, Tabin & Flannery, LLP

(57) ABSTRACT

A system for rush order fulfilment optimization is discussed. The system includes mobile devices that are each associated with a worker and a rush fulfillment engine executed by a computing system which dynamically updates a task queue of each worker upon receipt of a new rush order according to a task completion rate difference between an estimated
(Continued)

task completion rate and the current task completion rate of the worker.

20 Claims, 7 Drawing Sheets

Related U.S. Application Data continuation of application No. 16/891,654, filed on Jun. 3, 2020, now Pat. No. 11,074,549, which is a continuation of application No. 16/008,195, filed on Jun. 14, 2018, now Pat. No. 10,832,209.

(51) Int. Cl.
*G06Q 10/0631* (2023.01)
*G06K 7/10* (2006.01)
(52) U.S. Cl.
CPC . *G06Q 10/06312* (2013.01); *G06Q 10/06316* (2013.01); *G06K 7/10366* (2013.01)

(56) References Cited

U.S. PATENT DOCUMENTS

| | | | | |
|---|---|---|---|---|
| 5,890,134 | A * | 3/1999 | Fox | G06Q 10/06313 705/7.22 |
| 5,911,134 | A * | 6/1999 | Castonguay | G06Q 10/06 379/112.09 |
| 6,289,260 | B1 * | 9/2001 | Bradley | B65G 1/1376 414/280 |
| 6,744,436 | B1 * | 6/2004 | Chirieleison, Jr. | G06Q 10/087 345/419 |
| 7,295,990 | B1 * | 11/2007 | Braumoeller | G06Q 10/063 705/28 |
| 7,346,531 | B2 * | 3/2008 | Jacobs | G06Q 10/109 705/7.14 |
| 7,356,376 | B1 * | 4/2008 | Aboujaoude | G06Q 10/06 700/100 |
| 7,478,050 | B1 * | 1/2009 | Togawa | G06Q 10/06311 705/7.26 |
| 7,721,212 | B2 * | 5/2010 | Alfandary | G06Q 10/087 715/965 |
| 7,809,676 | B2 * | 10/2010 | Chorley | G06Q 10/06 707/600 |
| 7,930,050 | B2 * | 4/2011 | Wertheimer | G06Q 10/087 705/28 |
| 8,055,377 | B2 * | 11/2011 | Yair | G06Q 10/087 700/214 |
| 8,086,344 | B1 * | 12/2011 | Mishra | G06Q 10/087 700/214 |
| 8,201,737 | B1 * | 6/2012 | Palacios Durazo | G06Q 10/087 235/383 |
| 8,244,603 | B1 | 8/2012 | Tang | |
| 8,527,325 | B1 * | 9/2013 | Atreya | G06Q 10/06 700/214 |
| 8,571,702 | B1 * | 10/2013 | Haake | G06Q 10/047 705/26.1 |
| 8,571,915 | B1 * | 10/2013 | Wong | G06Q 10/06 705/7.26 |
| 8,839,132 | B2 * | 9/2014 | Reichert | G06Q 10/087 715/764 |
| 8,918,750 | B1 * | 12/2014 | Moffitt | G06F 30/18 716/122 |
| 8,983,647 | B1 * | 3/2015 | Dwarakanath | G05D 1/0297 700/216 |
| 9,172,738 | B1 * | 10/2015 | daCosta | G06Q 30/0601 |
| 9,466,045 | B1 * | 10/2016 | Kumar | G06Q 10/087 |
| 9,613,335 | B2 | 4/2017 | Grissom | |
| 9,665,899 | B1 | 5/2017 | Nair | |
| 9,741,068 | B2 | 8/2017 | Elberbaum | |
| 9,828,128 | B1 * | 11/2017 | Linnell | B65B 57/00 |
| 9,864,962 | B1 * | 1/2018 | Lehmann | G06Q 10/06311 |
| 10,007,947 | B2 * | 6/2018 | Seaward | G06Q 30/0631 |
| 10,026,044 | B1 * | 7/2018 | Wurman | G06Q 10/08 |
| 10,032,136 | B1 * | 7/2018 | Hamilton | G06Q 10/0633 |
| 10,043,149 | B1 * | 8/2018 | Iacono | G06Q 30/0637 |
| 10,133,797 | B1 | 11/2018 | Mishra | |
| 10,163,070 | B1 * | 12/2018 | Phillips | G06Q 10/083 |
| 10,248,929 | B2 * | 4/2019 | Lindbo | G06Q 10/087 |
| 10,445,667 | B2 | 10/2019 | Hamilton | |
| 10,482,421 | B1 * | 11/2019 | Ducrou | G06V 20/54 |
| 10,776,750 | B2 * | 9/2020 | Lindbo | G06Q 30/0621 |
| 10,832,209 | B2 | 11/2020 | Rajkhowa | |
| 10,943,285 | B1 * | 3/2021 | Grigsby | H04W 4/35 |
| 11,074,549 | B2 | 7/2021 | Rajkhowa | |
| 11,783,288 | B2 | 10/2023 | Rajkhowa | |
| 2003/0204431 | A1 * | 10/2003 | Ingman | G06Q 10/063116 705/7.26 |
| 2004/0068443 | A1 * | 4/2004 | Hopson | G06Q 10/08 705/5 |
| 2004/0153379 | A1 * | 8/2004 | Joyce | G06Q 10/08 705/28 |
| 2004/0183751 | A1 * | 9/2004 | Dempski | G02B 27/017 345/8 |
| 2005/0165629 | A1 | 7/2005 | Bruns | |
| 2005/0183087 | A1 | 8/2005 | Kubota | |
| 2005/0209902 | A1 * | 9/2005 | Iwasaki | G06Q 10/06316 705/7.14 |
| 2005/0278062 | A1 * | 12/2005 | Janert | G06Q 10/08 700/214 |
| 2006/0020366 | A1 * | 1/2006 | Bloom | G06Q 20/00 700/226 |
| 2006/0200264 | A1 * | 9/2006 | Kodama | G06Q 10/087 700/121 |
| 2007/0067200 | A1 * | 3/2007 | Patel | G06Q 10/063114 705/7.14 |
| 2007/0083283 | A1 * | 4/2007 | Ara | G06Q 10/063 700/111 |
| 2008/0162242 | A1 * | 7/2008 | Schneur | G06Q 10/06316 705/7.14 |
| 2008/0215179 | A1 | 9/2008 | Yair | |
| 2008/0301296 | A1 | 12/2008 | York | |
| 2009/0063035 | A1 * | 3/2009 | Mandel | G06F 30/18 701/437 |
| 2009/0063238 | A1 | 3/2009 | Storzum | |
| 2009/0082902 | A1 * | 3/2009 | Foltz | G06Q 10/087 700/214 |
| 2009/0094087 | A1 * | 4/2009 | Chung | G06Q 10/08 705/7.11 |
| 2009/0164041 | A1 * | 6/2009 | Geng | G06Q 10/08 700/214 |
| 2009/0228325 | A1 | 9/2009 | Simmons | |
| 2009/0265210 | A1 | 10/2009 | Bonner | |
| 2009/0288030 | A1 * | 11/2009 | Wahl | G06Q 10/06 718/100 |
| 2010/0287025 | A1 * | 11/2010 | Fletcher | G06Q 10/06 705/7.15 |
| 2010/0312605 | A1 | 12/2010 | Mitchell | |
| 2011/0035247 | A1 * | 2/2011 | Perry | G06Q 10/06 705/7.38 |
| 2011/0145057 | A1 | 6/2011 | Jones | |
| 2011/0208556 | A1 * | 8/2011 | Nagahara | G06Q 10/06 705/7.14 |
| 2012/0029963 | A1 * | 2/2012 | Olding | G06Q 10/06311 705/7.14 |
| 2012/0078673 | A1 * | 3/2012 | Koke | G06Q 10/06311 705/26.81 |
| 2012/0124591 | A1 * | 5/2012 | Cadambi | G06F 9/505 718/103 |
| 2013/0006718 | A1 | 1/2013 | Nielsen | |
| 2013/0103442 | A1 * | 4/2013 | Burks | G06Q 10/06311 705/7.13 |
| 2013/0111488 | A1 | 5/2013 | Gatti | |
| 2013/0218621 | A1 | 8/2013 | Jackson | |
| 2013/0311875 | A1 * | 11/2013 | Pappas | G06F 40/143 715/234 |
| 2014/0012612 | A1 * | 1/2014 | Abdic | G06Q 10/04 705/7.12 |

(56) References Cited

U.S. PATENT DOCUMENTS

| | | | |
|---|---|---|---|
| 2014/0040075 A1* | 2/2014 | Perry | G06Q 30/0635 |
| | | | 705/26.81 |
| 2014/0074745 A1* | 3/2014 | Nashif | G06Q 10/04 |
| | | | 705/337 |
| 2014/0136255 A1* | 5/2014 | Grabovski | G06Q 10/063114 |
| | | | 705/7.14 |
| 2014/0149172 A1* | 5/2014 | Rogut | G06Q 10/06316 |
| | | | 705/7.26 |
| 2014/0156553 A1* | 6/2014 | Leach | G06Q 10/08355 |
| | | | 705/337 |
| 2014/0214469 A1* | 7/2014 | Callow | G06Q 10/063114 |
| | | | 705/7.15 |
| 2014/0278627 A1* | 9/2014 | Grabovski | G06Q 10/06316 |
| | | | 705/7.26 |
| 2014/0279294 A1* | 9/2014 | Field-Darragh | H04B 5/77 |
| | | | 705/28 |
| 2014/0330605 A1* | 11/2014 | Connolly | G06Q 10/063116 |
| | | | 705/7.16 |
| 2014/0336814 A1 | 11/2014 | Moore | |
| 2015/0081088 A1 | 3/2015 | Lyon | |
| 2015/0106145 A1* | 4/2015 | Hamilton | G06Q 10/063114 |
| | | | 705/7.15 |
| 2015/0120514 A1* | 4/2015 | Deshpande | G06Q 30/016 |
| | | | 705/28 |
| 2015/0192774 A1* | 7/2015 | Watanabe | G06Q 10/08 |
| | | | 345/8 |
| 2015/0199641 A1* | 7/2015 | Napoli | G06Q 10/063114 |
| | | | 705/7.15 |
| 2015/0242918 A1* | 8/2015 | McCarthy | G06Q 30/0635 |
| | | | 705/26.43 |
| 2015/0262114 A1* | 9/2015 | Ming | G06Q 10/063114 |
| | | | 705/7.15 |
| 2015/0307278 A1 | 10/2015 | Wickham | |
| 2015/0332213 A1* | 11/2015 | Galluzzo | B25J 15/0085 |
| | | | 700/218 |
| 2015/0356496 A1 | 12/2015 | Bartholomew | |
| 2015/0356501 A1 | 12/2015 | Gorjestani | |
| 2016/0009493 A1* | 1/2016 | Stevens | B65G 1/1373 |
| | | | 700/216 |
| 2016/0063429 A1 | 3/2016 | Varley | |
| 2016/0078523 A1* | 3/2016 | Lopez | G06Q 10/087 |
| | | | 705/26.81 |
| 2016/0148303 A1* | 5/2016 | Carr | G06Q 30/0635 |
| | | | 705/26.81 |
| 2016/0176635 A1 | 6/2016 | Varley | |
| 2016/0189076 A1* | 6/2016 | Mellott | G06Q 10/06312 |
| | | | 705/7.14 |
| 2016/0196524 A1* | 7/2016 | Ito | G06Q 10/10 |
| | | | 705/7.14 |
| 2016/0203543 A1* | 7/2016 | Snow | G06Q 30/0635 |
| | | | 705/26.81 |
| 2016/0217410 A1* | 7/2016 | Santos | G06Q 10/063114 |
| 2016/0247113 A1 | 8/2016 | Rademaker | |
| 2016/0292011 A1* | 10/2016 | Colson | G06F 9/5027 |
| 2016/0300178 A1 | 10/2016 | Perry | |
| 2016/0307149 A1* | 10/2016 | Jones | G06Q 10/087 |
| 2016/0350837 A1 | 12/2016 | Williams | |
| 2017/0011449 A1 | 1/2017 | Mueller | |
| 2017/0024804 A1* | 1/2017 | Tepfenhart, Jr. | G06Q 30/0635 |
| 2017/0091704 A1* | 3/2017 | Wolf | G06Q 10/08 |
| 2017/0206591 A1* | 7/2017 | Deshpande | G06Q 10/087 |
| 2017/0213186 A1* | 7/2017 | Grifoni | G06Q 10/087 |
| 2017/0278041 A1* | 9/2017 | LaReau | G06Q 10/063114 |
| 2017/0278055 A1* | 9/2017 | Winkler | G06Q 10/08 |
| 2017/0323250 A1* | 11/2017 | Lindbo | G06Q 30/0621 |
| 2017/0337523 A1* | 11/2017 | Roach | G06Q 10/087 |
| 2018/0025460 A1* | 1/2018 | Watanabe | G06Q 10/087 |
| | | | 705/28 |
| 2018/0057264 A1* | 3/2018 | Wicks | B65G 1/1376 |
| 2018/0088586 A1* | 3/2018 | Hance | G06Q 10/08 |
| 2018/0096275 A1* | 4/2018 | Akutsu | H04W 4/02 |
| 2018/0096286 A1* | 4/2018 | Cook | G06Q 10/06316 |
| 2018/0127211 A1 | 5/2018 | Jarvis | |
| 2018/0158016 A1* | 6/2018 | Pandya | G05B 19/41895 |
| 2018/0182054 A1* | 6/2018 | Yao | G06Q 10/063112 |
| 2018/0204169 A1* | 7/2018 | Cao | G06Q 10/087 |
| 2018/0218440 A1 | 8/2018 | Kumar | |
| 2018/0240060 A1* | 8/2018 | Graham | G06Q 10/06314 |
| 2018/0240181 A1* | 8/2018 | Lopez | G06Q 10/00 |
| 2018/0247369 A1* | 8/2018 | Smith | G06Q 30/0635 |
| 2018/0260792 A1 | 9/2018 | Leclercq | |
| 2018/0276591 A1* | 9/2018 | Kim | G06Q 10/063114 |
| 2018/0315112 A1 | 11/2018 | Smith | |
| 2018/0341891 A1* | 11/2018 | Setchell | G06Q 10/10 |
| 2018/0364719 A1* | 12/2018 | Wang | G06F 16/22 |
| 2019/0057347 A1* | 2/2019 | Vitek | G06Q 10/0834 |
| 2019/0266552 A1* | 8/2019 | Gupta | G06Q 30/0201 |
| 2019/0279426 A1* | 9/2019 | Musunuri | G06V 20/20 |
| 2019/0294841 A1* | 9/2019 | Hall | G06Q 10/08 |
| 2019/0333011 A1* | 10/2019 | Wen | G06Q 30/0633 |
| 2020/0302391 A1* | 9/2020 | Li | G06Q 10/0875 |

OTHER PUBLICATIONS

G. Pedrielli, A. Vinsensius, E. P. Chew, L. H. Lee, A. Duri and Haobin Li, "Hybrid order picking strategies for fashion E-commerce warehouse systems," 2016 Winter Simulation Conference (WSC), Washington, DC, USA, 2016, pp. 2250-2261, doi: 10.1109/WSC.2016.7822266. (Year: 2016).*

B. Schwerdtfeger et al., "Pick-by-Vision: A first stress test," 2009 8th IEEE International Symposium on Mixed and Augmented Reality, Orlando, FL, 2009, pp. 115-124. (Year: 2009).

Hao, Shuai et al. "An optimal task decision method for a warehouse robot with multiple tasks based on linear temporal logic." 2017 IEEE International Conference on Systems, Man, and Cybernetics (SMC) (2017): 1453-1458. (Year: 2017).

Houde, J., Newberry, P., & Seim, K. (2017). Economies of density in E-commerce: A study of amazon's fulfillment center network. Cambridge: National Bureau of Economic Research, Inc. doi:https://doi.org/10.3386/w23361 (Year: 2017).

International Preliminary Report on Patentability for Application No. PCT/US2019/019545, dated Sep. 3, 2020, 6 pages.

International Search Report and Written Opinion for PCT/US2019/019545 dated May 10, 2019, pp. 1-11.

J. Wawerla and R. T. Vaughan, "A fast and frugal method for team-task allocation in a multi-robot transportation system," 2010 IEEE International Conference on Robotics and Automation, Anchorage, AK, 2010, pp. 1432-1437. (Year: 2010).

USPTO; U.S. Appl. No. 16/008,195; Notice of Allowance mailed Mar. 4, 2020.

USPTO; U.S. Appl. No. 16/008,195; Notice of Allowance mailed Jul. 8, 2020.

USPTO; U.S. Appl. No. 16/891,654; Notice of Allowance mailed Mar. 29, 2021.

USPTO; U.S. Appl. No. 16/891,654; Office Action mailed Dec. 23, 2020.

USPTO; U.S. Appl. No. 17/384,017; Notice of Allowance and Fees Due (PTOL-85) mailed Jun. 5, 2023; (pp. 1-15).

USPTO; U.S. Appl. No. 17/384,017; Notice of Allowance and Fees Due (PTOL-85) mailed Jun. 26, 2023; (pp. 1-1).

* cited by examiner

SYSTEMS AND METHODS FOR RUSH ORDER FULFILMENT OPTIMIZATION

CROSS-REFERENCE TO RELATED PATENT APPLICATIONS

This application is a continuation of U.S. application Ser. No. 17/384,017, filed Jul. 23, 2021, which is a continuation of U.S. application Ser. No. 16/891,654, filed Jun. 3, 2020, now U.S. Pat. No. 11,074,549, which is a continuation of U.S. application Ser. No. 16/008,195, filed Jun. 14, 2018, now U.S. Pat. No. 10,832,209, which claims priority to Indian Patent Application No. 201811007225, filed on Feb. 26, 2018, all of which are hereby incorporated by reference in their entirety.

BACKGROUND

In order fulfilment systems, picker schedules are maintained and a rush service picks the available capacity in terms of how many orders a picker can pick in a particular duration of time. The order fulfillment system utilizes this capacity to accept orders. The capacity is defined separately for different services, such as grocery fulfilment and general merchandise fulfilment, which results in disparate efficiencies, capacities and load.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
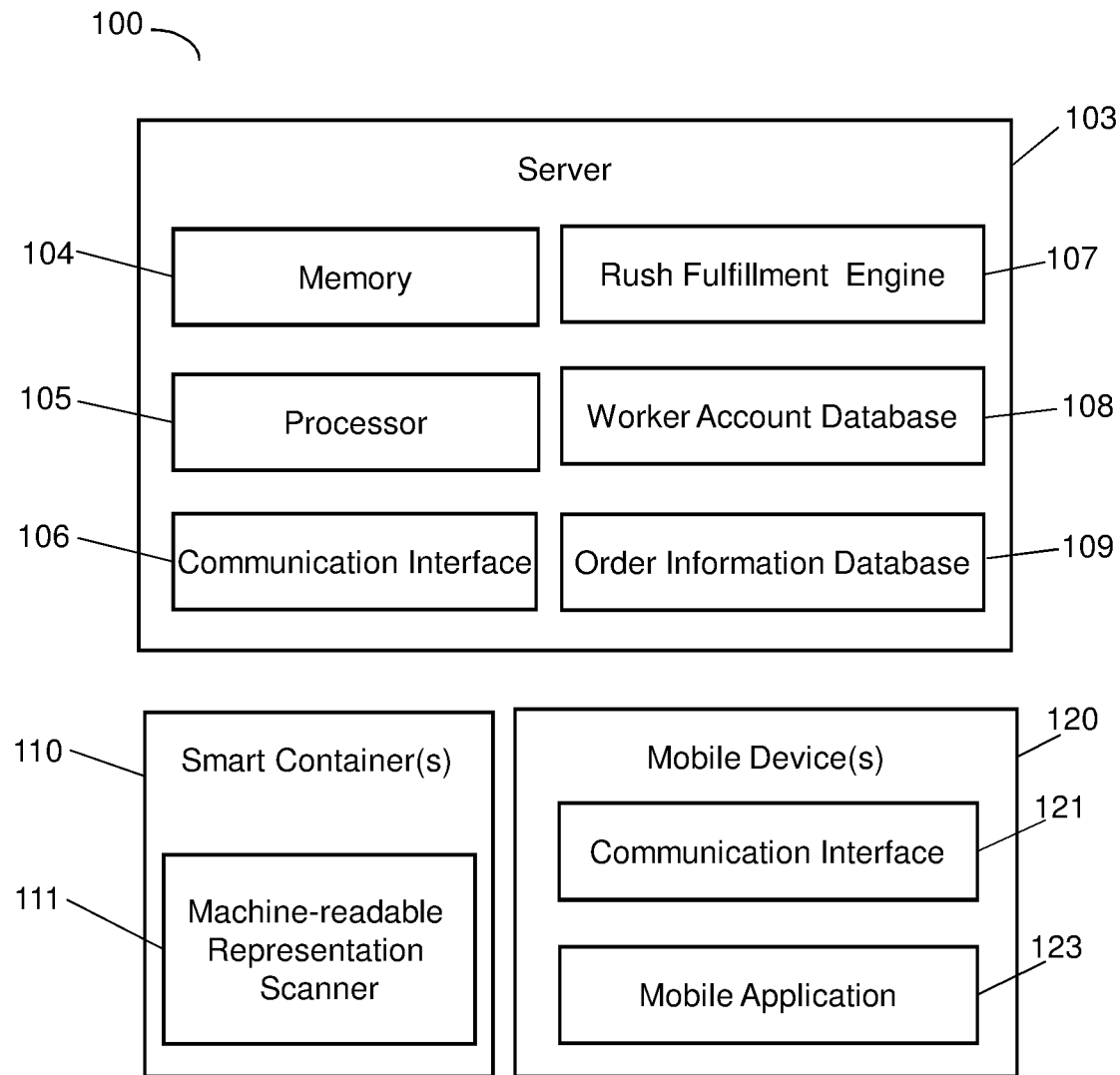
FIG. 1 illustrates an exemplary system for rush order fulfilment optimization in accordance with an exemplary embodiment of the present disclosure.

Described in detail herein is a system for rush order fulfilment optimization. The rush order fulfilment optimization system has a unified pool of pickers and can queue orders of different services, such as grocery fulfilment and general merchandise fulfilment, against the same picker. The system can have a dedicated picker pool for both grocery and general merchandise but also have an overarching pool used to queue orders of both grocery and general merchandise services that can be used to handle rush services. The system determines the picker availability in real-time so that a rush fulfillment engine can use the real-time picker availability to build order batches and queues against the picker and appropriately promise rush orders to the users who place orders. Capacity is calculated in real-time to system users and additional picker availability helps the system minimize loss of orders.

In one embodiment, a rush order fulfillment optimization system includes a "rush fulfillment engine" for determining the acceptance of, and scheduling of, rush services. The rush fulfillment engine is executed in real time to determine the availability of the rush service and the fulfilment time—both pick-up and delivery. In an embodiment the rush fulfillment engine has the following components:

1) A map store operations component that allows the rush fulfillment engine to model the store operations as per the strategy of the retailer and capture the sequence of events.

2) A dispensing constraint component that, whether manual or locker-based, drives the capacity to accept orders at any point in time.

3) A delivery constraint that enables the rush fulfillment engine to optimize time and cost across delivery and pick-pack for delivery orders.

4) An estimate operations time component as the time taken to fulfil the order depends on primary activities such as picking, delivery and dispense time.

5) A picker availability component that using a picker's schedule allows the rush fulfillment engine to determine when pickers will be available in the stores to promise against and pick rush orders. Defining capacity separately for different services such as but not limited to grocery and general merchandise results in disparate efficiencies, capacities and load. The rush order fulfillment optimization system described herein instead provides a unified pool of pickers and the ability to queue orders belonging to different services against the same picker for rush orders while also maintaining separate dedicated pools for the services.

In traditional picking environments, picker schedules are maintained and a rush service picks the available capacity in terms of how many orders a picker can pick in X duration of time. The rush systems then utilize this capacity (expressed as Y Orders of size X every hour) to accept orders from the website. In contrast to this conventional approach, embodiments of the present invention determine the picker availability dynamically based on picker availability determined after receiving an indication of an availability status received from a mobile device operated by the picker. The availability indication identifies to the rush fulfillment engine that a picker is now available for picking rush orders. This ensures that real picker availability is used in real-time when promising a customer a rush order. Once a picker indicates availability to the system, the rush fulfillment engine builds order batches and queues against the picker for rush order fulfillment.

Picking is an activity where store associates pick the items of a received order from the shop floor. Picking is the most cost intensive and manual activity related to fulfilling an order, especially in the stores where there is minimal automation as compared to distribution centers or warehouses. With the orders received by the rush order fulfillment optimization system and the number of pickers in the system, the rush fulfillment engine creates batches of orders for the pickers that are currently identified to be available for rush service (e.g.: those pickers for which an availability indication has been received from a mobile device operated by the picker). It will be appreciated that the indication of the availability status may take a number of forms, For example, without limitation, the indication may be a signal sent by a picker toggling a physical or virtual button on the mobile device. The indication may also be a selection provided via a user interface on the mobile device. Alternatively, the indication may be programmatically generated by the system as a result of an activity undertaken by the picker such as scanning a barcode on an item that indicates to the system that the picker is currently working and/or the particular order the picker is working on. In one embodiment, the rush fulfillment engine queues the first order in the system as a JIT (just in time) order. Thereafter with every new rush order, the rush fulfillment engine creates optimized batches using a number of different techniques such as proximate order batching (in which orders which are closer to each other are batched together ensuring better pick-walk) volumetric approaches—solving pareto optimization problems to optimize tote fill using item volumetric info) and final pick-walk approaches that include clustering (using k-means clustering to create high-density pick zones). Each of the created batches pull the picking start time from the first JIT order (placed very close to the pick up deadline) forward, closer to the "current time" providing a "must start picking time". Every new order thus results in updating existing batches, pulling the "must start picking time" closer to "current time". Once it is not possible to expand a current batch (either due to a picking capacity constraint or the must start time crosses the current time), a new batch is opened—either with another picker or behind the current batch. The rush order fulfillment engine ensures that the estimated end time of each batch does not extend beyond X hours relative to when the order was placed. Constraints such as picker carrying capacity, storage constraints and order related rules are also applied while forming the batches. Orders that cannot be handled within applicable time limits are rejected for rush handling and the customer is so informed.

The rush order fulfillment engine queues batches (single or multiple orders) against workers to process. At the incoming end, individual queues are maintained for each picker; this enables the rush order fulfillment engine to estimate the fulfilment time for each batch (ensuring that the promised due time of the first order of any batch is never compromised as more orders are added to the batch). A multi-server single queue model is used to process the batches at the outgoing end to ensure that batches with earlier completion times are always processed first. The multi-server single queue model at the processing end ensures picker utilization and doesn't allow propagating of delays due to one batch to all the other batches in the queue, thus making sure that the other pickers provide services as needed.

In one embodiment the picker queues are updated in real-time to so that events in operations are captured thus ensuring that all latest promise times are updated for the next rush promise. These events may include, but are not limited to, early pick begins, early pick ends, real time item picking information, new pickers coming into the system etc.

In an embodiment, the number of orders that are rejected due to the inability to queue orders against batches in a picker queue while still being a rush service are recorded. For instance, if the new order has to be queued so far out in the future that it no longer remains a rush order, then that order is cancelled. The system may provide feedback on estimated pick rates (rate at which a picker picked the constituent items of an order vs. the expected rate of picking to correct the estimations).

FIG. 1 illustrates an exemplary system for order fulfillment optimization in accordance with an exemplary embodiment of the present disclosure. The rush order fulfillment optimization system 100 includes a computing device such as server 103. Server 103 includes memory 104, a processor 105 and communication interface 106. Server 103 is configured to execute rush fulfillment engine 107 and also includes or is able to access a worker account database 108, and order information database 109. Rush fulfillment engine 107 makes use of communications interface 106 to receive transmitted task completion data from a mobile application 123 executing on a mobile device 120. Rush fulfillment engine 107 is configured to determine the availability of the worker and assign new tasks to the worker according to the worker's availability. Worker account database 108 includes information associated with the worker or picker, such as the worker's existing task queue. The order information database 109 includes information regarding the placed order and information regarding the items included in each order.

Communication interface 106, in accordance with various embodiments can include, but is not limited to, a radio frequency (RF) receiver, RF transceiver, NFC device, a built-in network adapter, network interface card, PCMCIA network card, card bus network adapter, wireless network adapter, USB network adapter, modem or any other device suitable for interfacing with any type of network capable of communication and performing the operations described herein. Processor 105, in accordance with various embodiments can include, for example, but not limited to, a microchip, a processor, a microprocessor, a special purpose processor, an application specific integrated circuit, a microcontroller, a field programmable gate array, any other suitable processor, or combinations thereof. Server 103 may also include, memory (not shown) such a but not limited to, hardware memory, non-transitory tangible media, magnetic storage disks, optical disks, flash drives, computational device memory, random access memory, such as but not limited to DRAM, SRAM, EDO RAM, any other type of memory, or combinations thereof.

Mobile device 120 includes communication interface 121 for communicating with the server 103 and executes a mobile application 123. Mobile device 120 may be smartphone, tablet or other mobile device equipped with a processor, mobile application 123 and communication interface 121. The mobile application 123 can generate a user interface for accepting user input and may be configured to control an integrated data acquisition device such as, but not limited to, a ON switch to generate an available status indication in response to the worker's operation to the ON switch. Alternatively, as noted above, other techniques such as but not limited to selections received via a user interface provided by mobile application 123 or programmatically generated upon task completion may provide the indication of availability status for a worker. Mobile application 123 transmits the generated availability indication via communication interface 121 to rush fulfillment engine 107 on server 103. The availability indication indicates to rush fulfillment engine 107 the availability of the worker. When filling rush orders, rush fulfillment engine 107 may update the task queue of each worker according to the availability of the worker, and transmit the updated task queue to the user device 120. The task queue of each worker may be stored in worker account database 108 or another database.

Smart container 110 can be any container suitable for holding items, such as a tote or trolley with integrated containers. The smart container 110 includes at least one machine-readable representation scanner 111 which can be, as a non-limiting example, a barcode scanner, an RFID reader, an NFC reader, a barcode reader, a digital camera, a mobile device, a magnetic strip reader, a point of sale terminal, any other suitable device, or combinations thereof. When an item is put into the smart container 110, the machine-readable representation scanner 111 scans a machine-readable representation on the item and may transmit a task completion indication to rush fulfillment engine 107 on server 103. The task completion indication may be sent with each scanned item or only on the last item in an order or batch and may indicate worker availability to rush fulfillment engine 107. The smart container 110 can also include an integrated transmitter or transceiver for transmitting the task completion indication to rush fulfillment engine 107. In one embodiment, smart container 110 may have a separate scanner on every interior surface or every interior wall.

Figure 2:
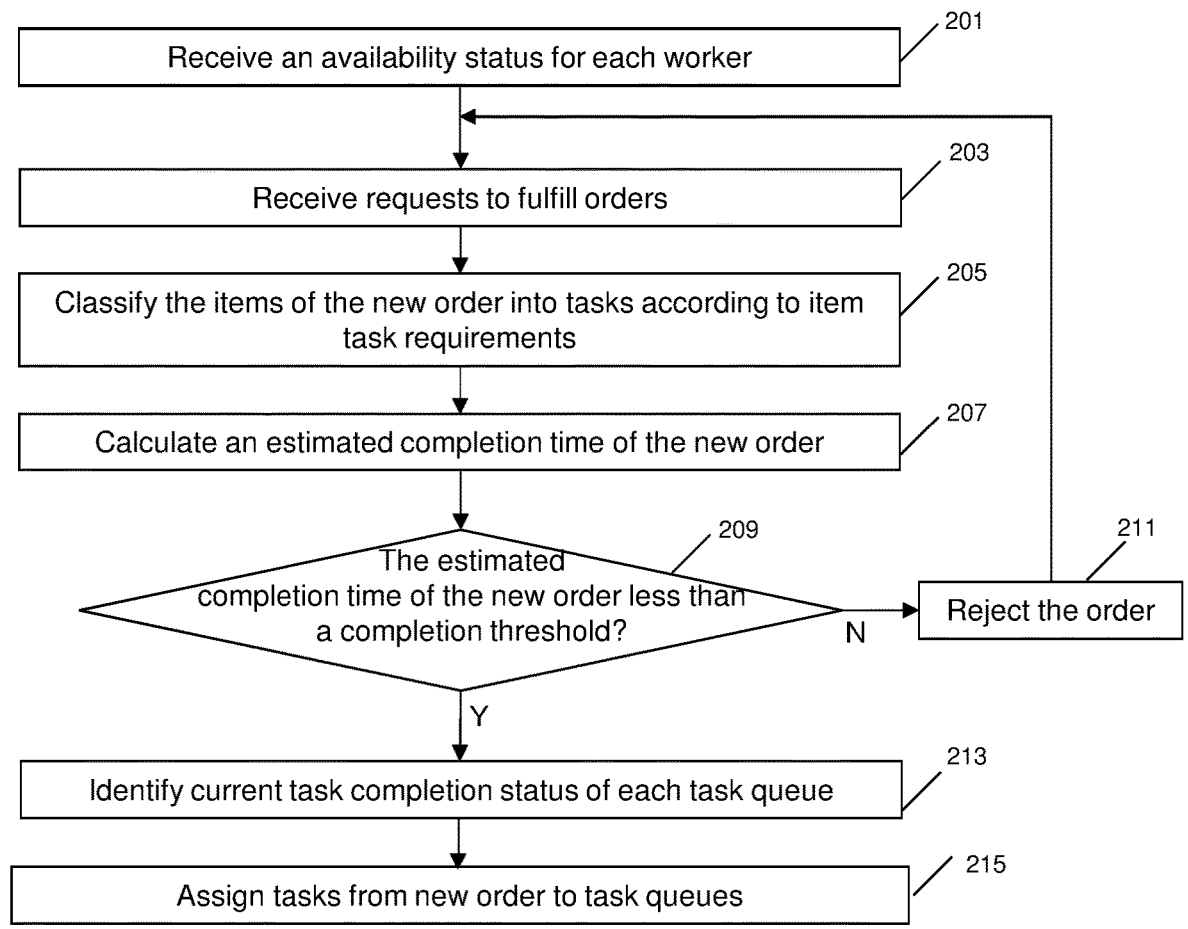
FIG. 2 is a flow diagram illustrating a process of fulfilling orders in accordance with an exemplary embodiment of the present disclosure.

FIG. 2 shows a flow diagram illustrating an exemplary process of fulfilling orders in accordance with various embodiments. In step 201, the mobile device associated with a worker wirelessly communicates a current availability status of the worker to the rush fulfillment engine. In step 203, the rush fulfillment engine receives requests to fulfill orders that include one or more items and is subject to a completion threshold.

Upon receipt of each new order, in step 205 the rush fulfillment engine classifies the items of the new order into different tasks according to item task requirements associated with the items. The item task requirements include item location, item category, and an item task completion time limitation based on the item category and location. For example, items in a grocery category and items in a general merchandise category can be classified as different groups, items stored at different locations can be classified differently, and items with task completion time limitations that require completion sooner than the other items can be classified in different groups.

In step 207, the rush fulfillment engine calculates an estimated completion time of the new order based on an estimated completion time of the tasks associated with the items included in the order. In one embodiment, the rush fulfillment engine may utilize past records of similar task completion in forming estimates in addition to task requirement information. In step 209, the system determines whether the estimated completion time of the new order meets the completion threshold such as qualifying for a promised service delivery window. When the estimated completion time of the new order is determined to be greater than the completion threshold (and therefore not satisfy the threshold), the new order is rejected in step 211 and the system continues to receive new requests to fulfil orders in step 203. In one embodiment, customers may be notified of the rejection at the time of ordering and offered an option to place a non-rush order.

When the rush fulfillment engine determines that the estimated completion time of the new order is less than the completion threshold, i.e., it is acceptable for a rush order, the system attempts to identify available capacity among the picker/worker pool to fill the order. In step 213 the rush fulfillment engine identifies the current task completion status of each task queue associated with a worker. The current task completion status of each queue may be determined based on the current tasks in the queue (and their associated requirements and constraints) and the availability status of the worker received via the worker's mobile device. In step 215, the rush fulfillment engine assigns one or more tasks from the new order to those workers whose current task completion status indicates that the new tasks may be processed while satisfying the completion threshold of the new order. It should be noted that although the description herein has focused on picking tasks, other tasks such as packing and dispensing may also be considered by the rush fulfillment engine.

In one embodiment, the current task completion status for a worker/worker's queue may be monitored via the use of a smart container. As noted above, the smart container may include one or more scanners that scan an item put into the container. When the worker puts the item into the smart container the item's machine-readable representation is automatically scanned and the smart container transmits a task completion indication to the computing system indicating this task in the worker's queue is completed.

In some embodiments, the rush fulfillment engine can monitor a current location of the worker based on a location signal received by the computing system from the mobile device associated with the worker and update likely task completion times based on location.

In an embodiment, a mobile device operated by a user may include a mobile application executable on the mobile device, and the mobile application can receive the task queue from the rush fulfillment engine, display the received task queue on the mobile device, and transmit task completion indication to the rush fulfillment engine when an assigned task is completed.

Figure 3:
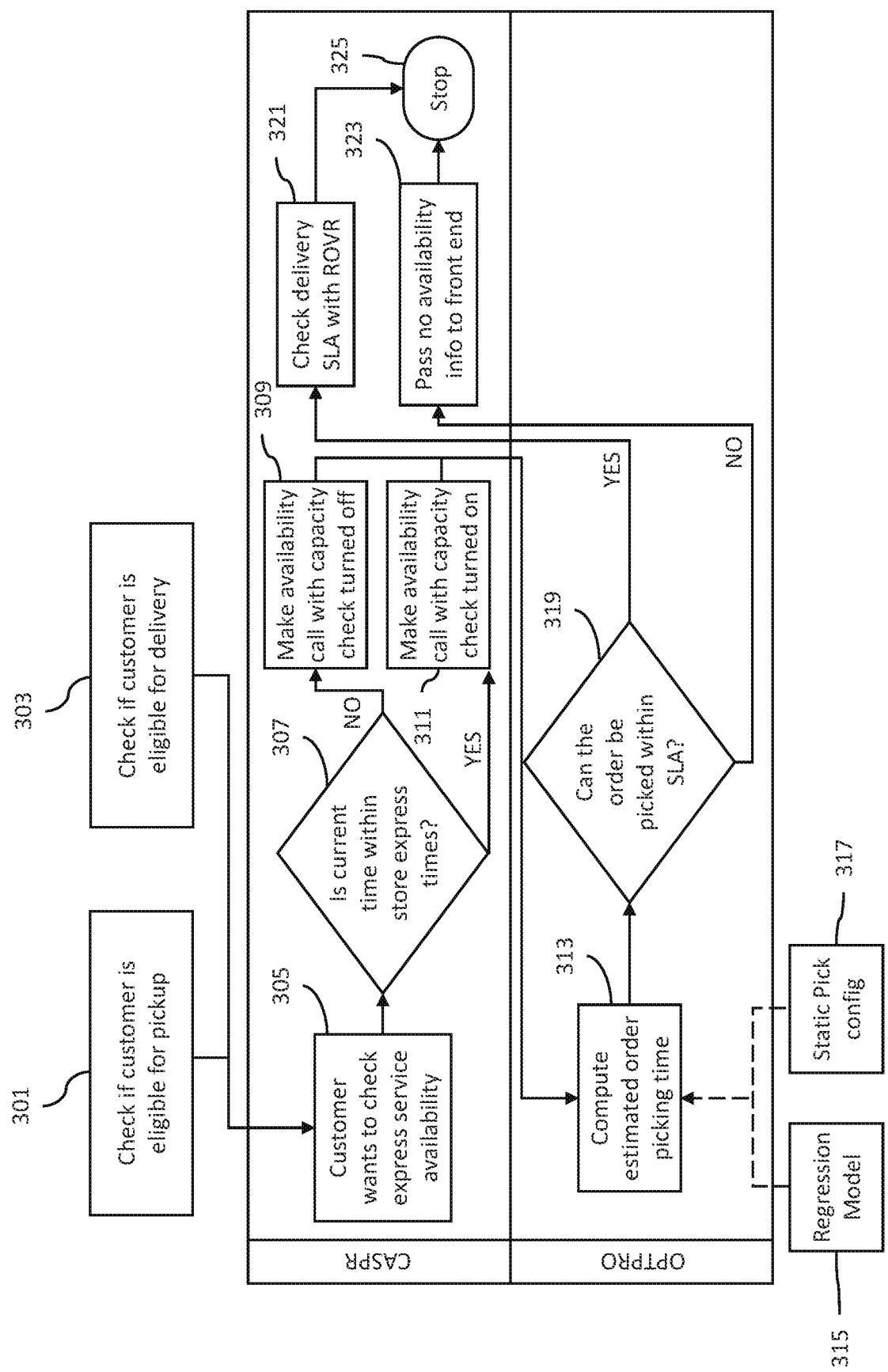
FIG. 3 illustrates a process of accepting an order in accordance with an exemplary embodiment.
Figure 4:
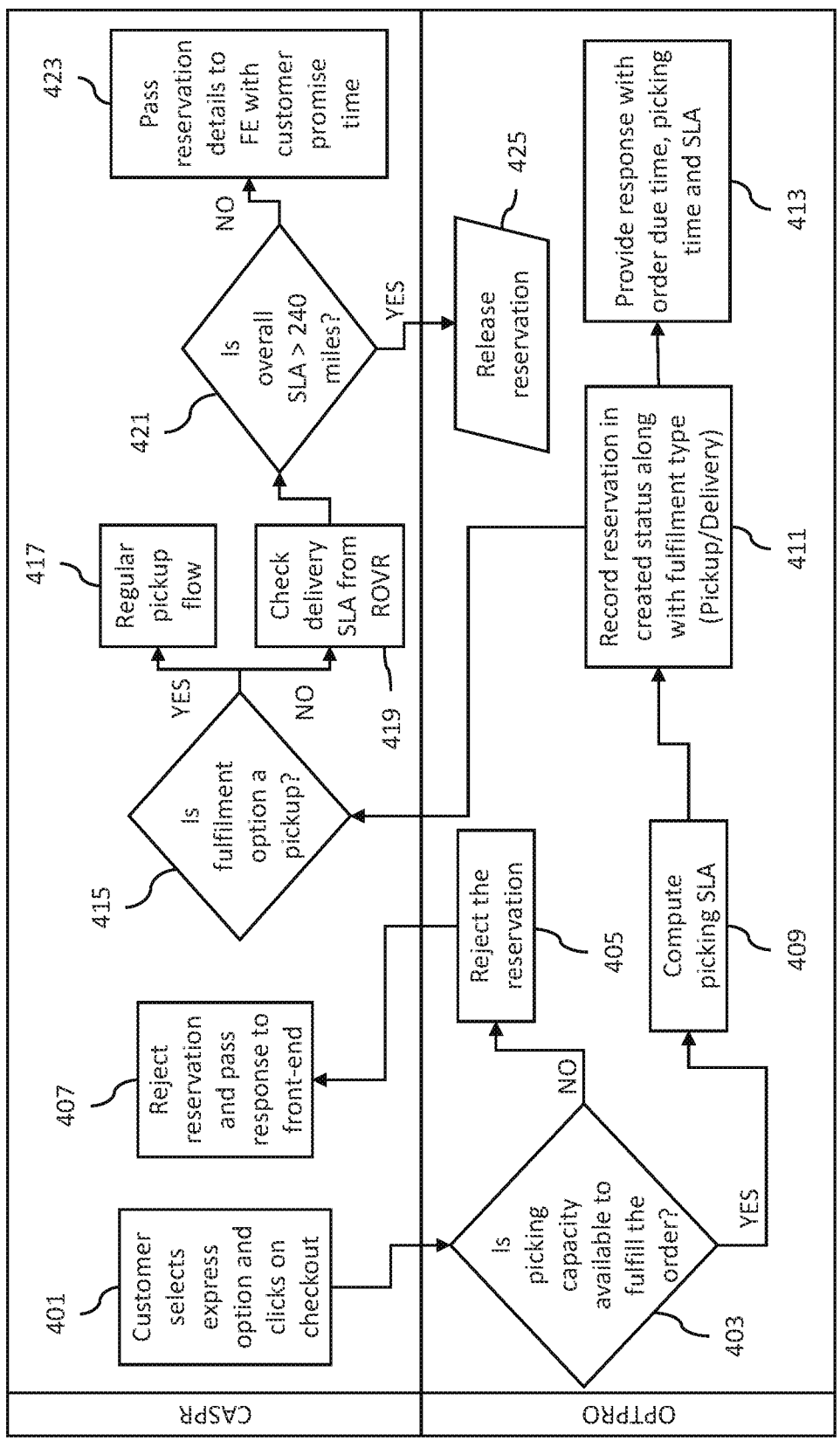
FIG. 4 illustrates a process of creating an express order in accordance with an exemplary embodiment.
Figure 5:
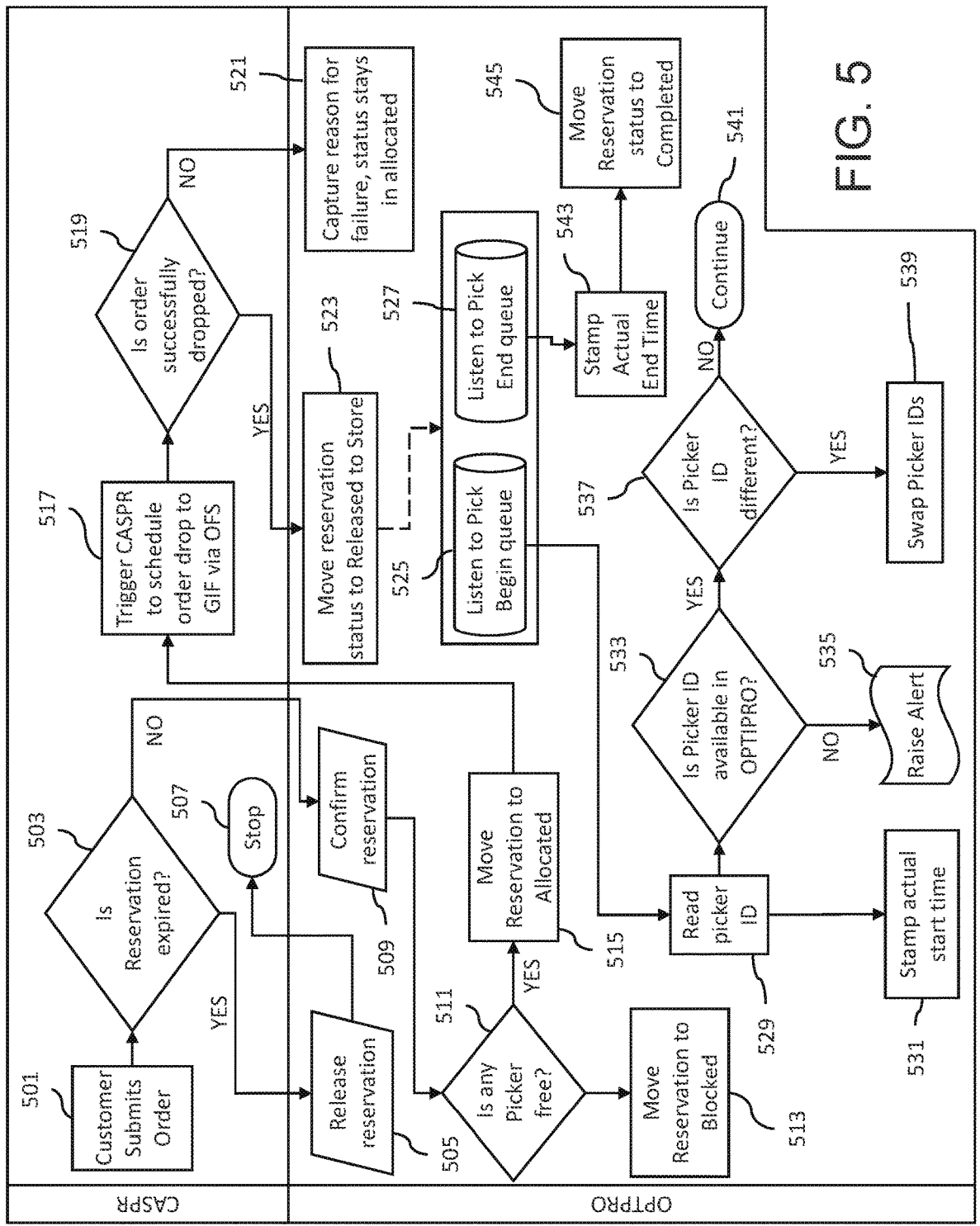
FIG. 5 illustrates a process of managing worker and task assignments in accordance with an exemplary embodiment.

The processing of potential rush order services by the rush order fulfillment optimization system in exemplary embodiments is described in more detail in relation to FIGS. 3-5.

FIG. 3 illustrates a process of accepting an order in accordance with various embodiments. When the rush order fulfillment optimization system receives a new order placed by a user, the system checks if the user is eligible for pickup in step 301, and checks if the user is eligible for delivery in step 303. In step 305 the user checks express service availability. In step 307 the system determines whether the current time is within store express times. If the current time is not within store express times, the system makes an availability call with capacity check turned off in step 309 (for handling on a non-express basis), and if the current time is within store express times, the system makes an availability call with capacity check turned on in step 311 to determine if workers are available to satisfy the request.

In step 313 the system computes estimated order picking time according to a regression model 315 and static pick configurations 317. In step 319 the system determines whether the order can be picked within a time period spelled out in a Service Level Agreement (SLA). If the order can be picked within SLA, the system checks delivery SLA with ROVR (a last mile routing system) in step 321. If the order cannot be picked within the SLA, the system passes no availability information to the front end (FE/website) in step 323, and the process stops in step 325.

FIG. 4 illustrates a process of creating an express order in accordance with various embodiments. In step 401, when placing an order, the user selects an express option and clicks on checkout. In step 403 the rush order fulfillment optimization system determines whether the picking capacity is available to fulfill the order. If the picking capacity is not available to fulfill the order, the system rejects the reservation in step 405 and passes the response to the front end/website in step 407. If the picking capacity is available to fulfill the order, the system computes picking SLA in step 409. In step 411 the system records the reservation created status along with fulfilment type, for example, pickup or delivery. In step 413 the system provides a response with order due time, picking time and SLA.

In step 415 the system determines whether the fulfilment option is pickup. If the fulfilment option is pickup, in step 417 the system performs regular pickup flow. If the fulfilment option is not pickup, in step 419 the system checks delivery SLA from the last mile routing system (ROVR).

Then in step 421 the system determines whether the overall SLA from the last mile routing system is greater than 240 minutes. If the overall SLA is less than 240 minutes, and the order can be handled as a rush order, in step 423 the system passes reservation details to the front end/website with a customer promise time for delivery. If the overall SLA is greater than 240 minutes, in step 425 the system releases reservation since it will take too long to process as a rush order. It will be appreciated that the 240 minutes amount of time set as the threshold for SLA is adjustable within the scope of the present invention.

FIG. 5 illustrates a process of managing worker and task assignments in accordance with various embodiments. After a user submits an order in step 501, the system determines whether the reservation is expired in step 503. If reservation is expired, the system releases the reservation in step 505 and the process stops in step 507. If the reservation is not expired, the system confirms the reservation in step 509, and determines whether there is any picker or worker free. If there is no worker free, the system moves the reservation to Blocked status in step 513. If there are workers free, the system moves the reservation to Allocated status in step 515. Then in step 517, a slot reservation system is triggered to schedule order drop to the store fulfillment system via OFS.

In step 519 the system determines whether the order is successfully dropped. If the order is not successfully dropped, in step 521 the system captures the reason for failure and the status stays in Allocated. If the order is successfully dropped, in step 523 the system moves the reservation status to Released To Store status. Then the system listens to Pick Begin queue in step 525 and listens to Pick End queue in step 527. After the system listens to Pick Begin queue in step 525, the system reads picker ID in step 529 and stamps actual start time in step 531. Then in step 533 the system determines whether the picker ID is available in the queuing system. If the picker ID is not available, the system raises an alert in step 535. If the picker ID is available, in step 537 the system further determines whether the picker ID is different. If the picker ID is different, the system swaps picker IDs in step 539. If the picker ID is not different, the system continues in step 541. Referring back to step 527 in which the system listens to Picker End queue, then the system stamps Actual End Time in step 543 and then moves reservation status to Completed status in step 545.

Figure 6:
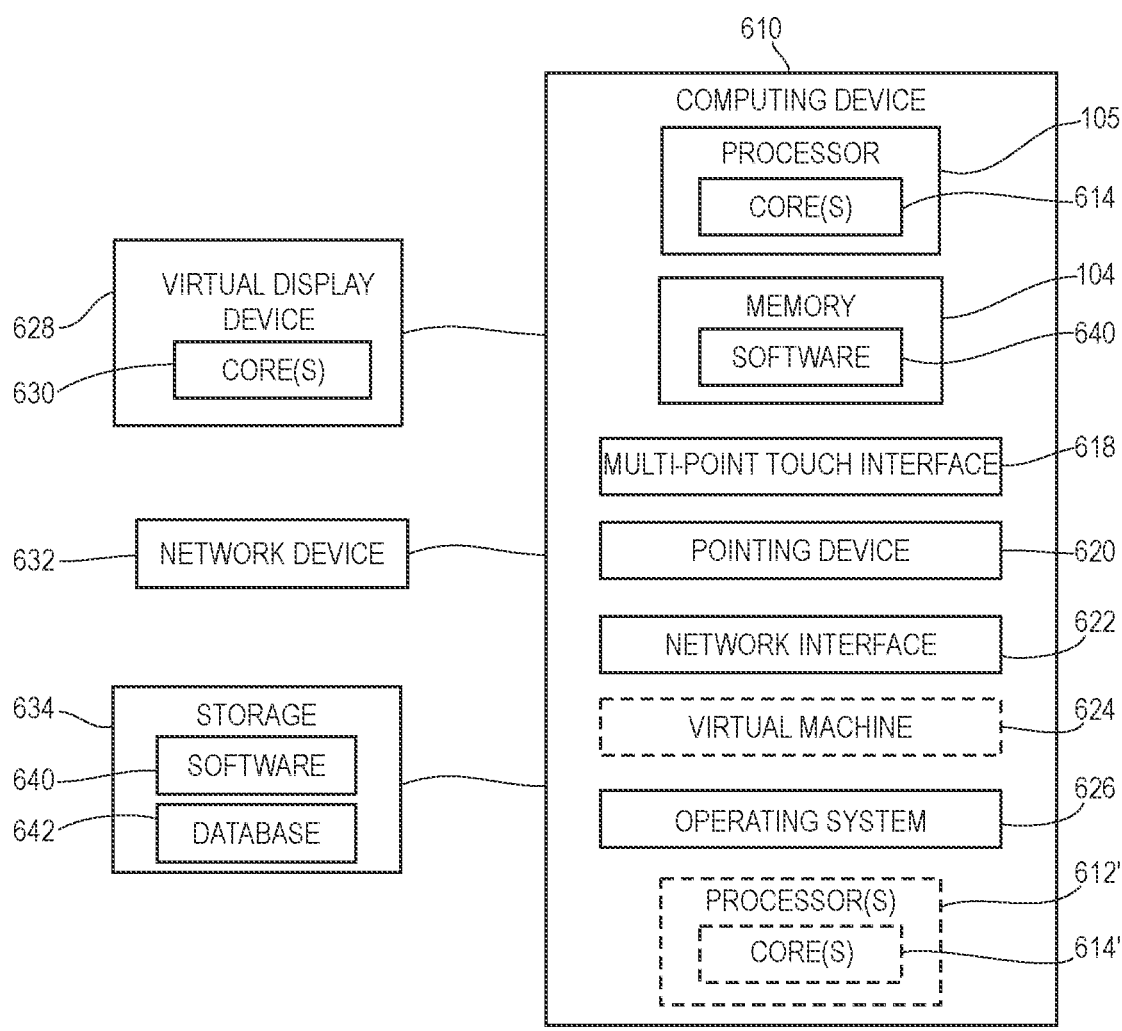
FIG. 6 is a block diagram of an exemplary computational device with various components which can be used to implement an exemplary embodiment.

FIG. 6 is a block diagram of an exemplary computing device 610 such as can be used, or portions thereof, in accordance with various embodiments and, for clarity, refers back to and provides greater detail regarding various elements of the system 100 of FIG. 1. The computing device 610, which can be, but is not limited to the server, user mobile device and data capture device described herein, can include one or more non-transitory computer-readable media for storing one or more computer-executable instructions or software for implementing exemplary embodiments. The non-transitory computer-readable media can include, but not limited to, one or more types of hardware memory, non-transitory tangible media (for example, one or more magnetic storage disks, one or more optical disks, one or more flash drives), and the like. For example, memory 104 included in the computing device 610 can store computer-readable and computer-executable instructions or software for performing the operations disclosed herein. For example, the memory 104 can store a software application 640 which is configured to perform the disclosed operations (e.g., optimize order fulfilment). The computing device 610 can also include configurable and/or programmable processor 107 and an associated core 614, and optionally, one or more additional configurable and/or programmable processing devices, e.g., processor(s) 612' and associated core(s) 614' (for example, in the case of computational devices having multiple processors/cores), for executing computer-readable and computer-executable instructions or software stored in the memory 104 and other programs for controlling system hardware. Processor 107 and processor(s) 612' can each be a single core processor or multiple core (614 and 614') processor.

Virtualization can be employed in the computing device 610 so that infrastructure and resources in the computing device can be shared dynamically. A virtual machine 624 can be provided to handle a process running on multiple processors so that the process appears to be using only one computing resource rather than multiple computing resources. Multiple virtual machines can also be used with one processor.

Memory 104 can include a computational device memory or random access memory, such as DRAM, SRAM, EDO RAM, and the like. Memory 104 can include other types of memory as well, or combinations thereof.

A user can interact with the computing device 610 through a visual display device 628, such as any suitable device capable of rendering texts, graphics, and/or images including an LCD display, a plasma display, projected image (e.g. from a Pico projector), Google Glass, Oculus Rift, HoloLens, and the like, and which can display one or more user interfaces 630 that can be provided in accordance with exemplary embodiments. The computing device 610 can include other I/O devices for receiving input from a user, for example, a keyboard or any suitable multi-point touch (or gesture) interface 618, a pointing device 620 (e.g., a mouse). The keyboard 618 and the pointing device 620 can be coupled to the visual display device 628. The computing device 610 can include other suitable conventional I/O peripherals.

The computing device 610 can also include one or more storage devices 634, such as a hard-drive, CD-ROM, flash drive, or other computer readable media, for storing data and computer-readable instructions and/or software that perform operations disclosed herein. In some embodiments, the one or more storage devices 634 can be detachably coupled to the computing device 610. Exemplary storage device 634 can also store one or more software applications 640 for implementing processes of the rush order fulfillment optimization system described herein and can include databases 642 for storing any suitable information required to implement exemplary embodiments. The databases can be updated manually or automatically at any suitable time to add, delete, and/or update one or more items in the databases. In some embodiments, at least one of the storage device 634 can be remote from the computing device (e.g., accessible through a communication network) and can be, for example, part of a cloud-based storage solution.

The computing device 610 can include a network interface 622 configured to interface via one or more network devices 632 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 622 can include a built-in network adapter, network interface card, PCMCIA network card, card bus network adapter, wireless network adapter, USB network adapter, modem or any other device suitable for interfacing the computing device 610 to any type of network capable of communication and performing the operations described herein. Moreover, the computing device 610 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 610 can run operating systems 626, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 626 can be run in native mode or emulated mode. In an exemplary embodiment, the operating system 626 can be run on one or more cloud machine instances.

Figure 7:
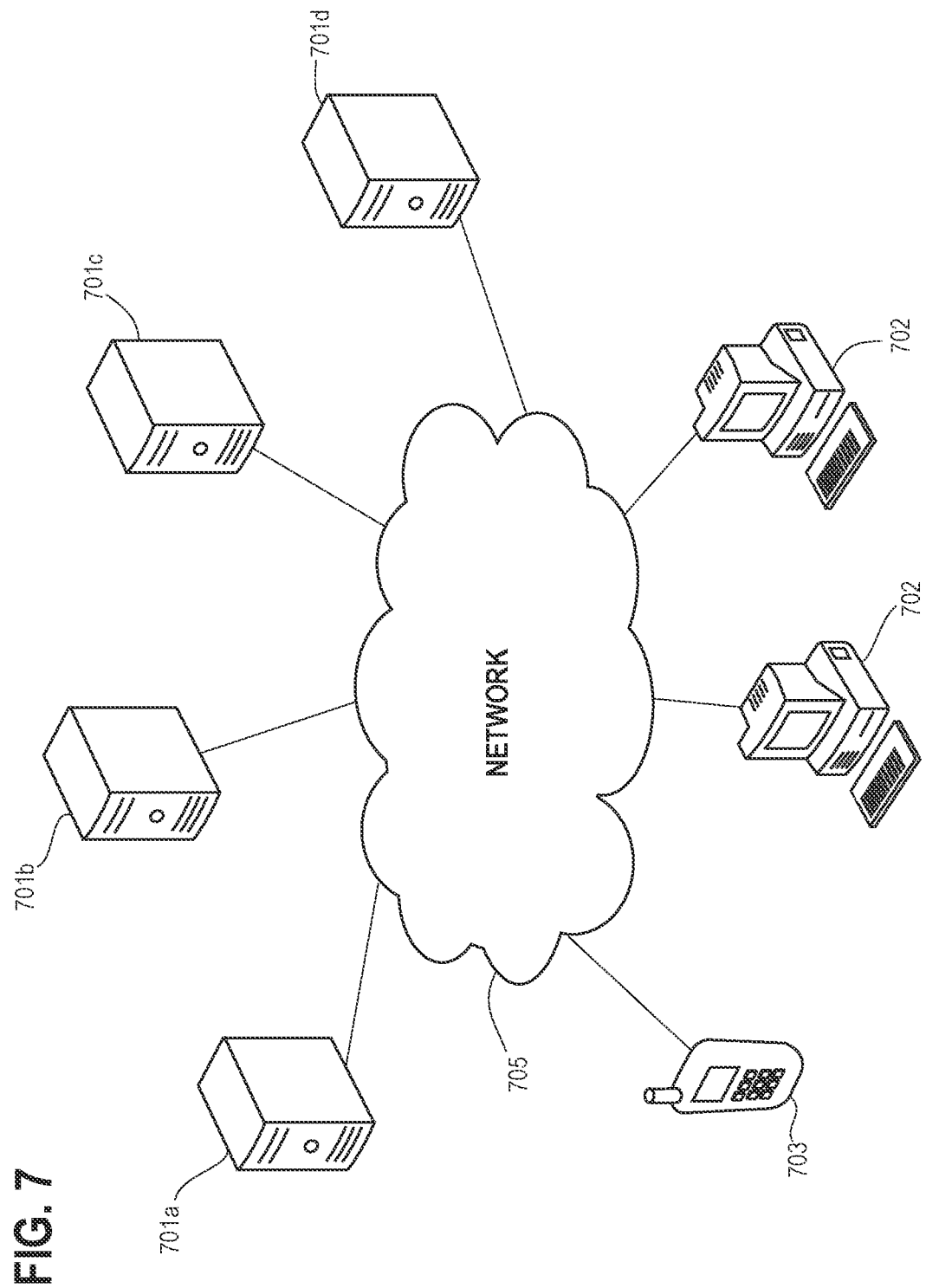
FIG. 7 is block diagram of an exemplary distributed system suitable for use in an exemplary embodiment.

FIG. 7 is a block diagram of exemplary distributed and/or cloud-based embodiments. Although FIG. 1, and portions of the exemplary discussion above, make reference to an rush order fulfillment optimization system 100 operating on a single computing device, one will recognize that various of the modules within the rush order fulfillment optimization system 100 may instead be distributed across a network 706 in separate server systems 701*a-d* and possibly in user systems, such as a desktop computer device 702, or mobile computer device 703. As another example, the user interface provided by the mobile application 123 can be a client side application of a client-server environment (e.g., a web browser or downloadable application, such as a mobile app), wherein the rush fulfillment engine 109 is hosted by one or more of the server systems 701*a-d* (e.g., in a cloud-based environment) and interacted with by the desktop computer device or mobile computer device. In some distributed systems, the modules of the system 100 can be separately located on server systems 701*a-d* and can be in communication with one another across the network 706.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An order fulfillment optimization system for fulfilling orders, the system comprising:

a computing device in communication with one or more databases, the one or more databases storing order information and information associated with workers of a retail facility, wherein the order information includes data indicating a completion threshold associated with each of the orders, wherein the information associated with the workers includes data received from mobile devices of the workers and indicating:

interactions by the workers with the mobile devices of the workers when the workers begin tasks in the task queues of the workers; and interactions by the workers with the mobile devices of the workers when the workers end the tasks in the task queues of the workers, and wherein the computing device executes a fulfillment engine, which, when executed:

calculates, for an order having a plurality of items, an estimated completion time of the order based on an estimated completion time of item task requirements associated with the plurality of items of the order;

determines, based at least in part on an analysis of the data received via the mobile devices of the workers and indicating the interactions by the workers with the mobile devices of the workers when the workers begin the tasks in the task queues and when the workers end the task queues of the workers, and based at least in part on analysis of time stamps indicating when the workers began the tasks in the task queues and time stamps indicating when the workers ended the tasks in the task queues, a task completion status for each of the workers and an availability status for each of the workers, determines, based on the task completion status and the availability status determined for each of the workers, whether the estimated completion time required for the order meets a completion threshold associated with the order;

obtains, from the one or more databases, the data indicating the completion threshold associated with the order; and assigns, when the estimated completion time required for the order meets the completion threshold, one or more item tasks associated with the plurality of items of the order to one or more of the workers.

2. The system of claim 1, further comprising a smart container including at least one machine-readable representation scanner, wherein the smart container transmits, to the fulfillment engine, a task completion indication in response to the machine-readable representation scanner scanning a machine-readable representation located on an item when the item is put into the smart container.

3. The system of claim 2, wherein the smart container includes a separate scanner on every interior surface in the container.

4. The system of claim 1, wherein the computing device is further configured to:

monitor a current location of the worker based on a location signal received by the computing device from a mobile device associated with the worker.

5. The system of claim 1, wherein the one or more item tasks include at least one of picking, packing and dispensing.

6. The system of claim 1, further comprising:
a mobile application executable on each of a plurality of user mobile devices respectively associated with each of the workers, the mobile application when executed:
receiving, from the computing device, a task queue;
displaying the received task queue on the user mobile device; and
transmitting, to the computing device, a task completion indication when a worker completes a task assigned to the worker.

7. The system of claim 1, wherein the computing device is further configured to monitor a location of one of the workers based on a location signal received from a user mobile device of the one of the workers.

8. The system of claim 1, wherein the item task requirements include item location, item category, and item task completion time limitation based on the item category.

9. The system of claim 1, wherein a mobile application executing on a mobile device associated with one of the plurality of workers when executed, transmits the availability status of a worker in response to an operation by the worker associated with the mobile device.

10. The system of claim 1, wherein the fulfillment engine rejects the order when the estimated completion time for the new order fails to meet the completion threshold.

11. A computer-implemented method for fulfilling a plurality of orders, the method comprising:
storing, in one or more databases, order information and information associated with workers of a retail facility, wherein the order information includes data indicating a completion threshold associated with each of the orders,
wherein the information associated with the workers includes data received from mobile devices of the workers and indicating:
interactions by the workers with the mobile devices of the workers when the workers begin tasks in the task queues of the workers; and
interactions by the workers with the mobile devices of the workers when the workers end the tasks in the task queues of the workers;
providing a fulfillment engine executed by a computing device and in communication with the one or more databases;
by the fulfillment engine:
calculating, for an order of the plurality orders, the order having a plurality of items, an estimated completion time of the order based on an estimated completion time of item task requirements associated with the plurality of items of the order;
determining, based at least in part on an analysis of the data received via the mobile devices of the workers and indicating the interactions by the workers with the mobile devices of the workers when the workers begin the tasks in the task queues and when the workers end the task queues of the workers, and based at least in part on analysis of time stamps indicating when the workers began the tasks in the task queues and time stamps indicating when the workers ended the tasks in the task queues, a task completion status for each of the workers and an availability status for each of the workers,
determining, based on the task completion status and the availability status determined for each of the workers, whether the estimated completion time required for the order meets a completion threshold associated with the order;
obtaining, from the one or more databases, the data indicating the completion threshold associated with the order; and
assigning, when the estimated completion time required for the order meets the completion threshold, one or more item tasks associated with the plurality of items of the order to one or more of the workers.

12. The method of claim 11, further comprising transmitting, by a smart container including at least one machine-readable representation scanner, to the fulfillment engine, a task completion indication in response to the machine-readable representation scanner scanning a machine-readable representation located on an item when the item is put into the smart container.

13. The method of claim 12 wherein the smart container includes a separate scanner on every interior surface in the container.

14. The method of claim 11, further comprising monitoring a current location of a worker of the workers based on a location signal received by the computing system from a mobile device associated with the worker.

15. The method of claim 11, wherein the one or more of the item tasks include at least one of picking, packing and dispensing.

16. The method of claim 11, further comprising receiving, by a mobile application executable on each of a plurality of user mobile devices respectively associated with each of the workers, from the computing device, the task queue; and
displaying, by the mobile application, the received task queue on a respective one of the user mobile devices; and
transmitting to the computing device, by the mobile application executable on the respective one of the user mobile device, a task completion indication when a worker completes a task assigned to the worker.

17. The method of claim 11, further comprising monitoring, by the computing device, a location of one of the workers based on a location signal received from a user mobile device of the one of the workers.

18. The method of claim 11, further comprising transmitting, by the mobile application executable on the plurality of user mobile devices, the availability status of a worker in response to an operation by the worker.

19. The method of claim 11, further comprising rejecting the order with the fulfillment engine when the estimated order task completion time is greater than the threshold.

20. A non-transitory medium holding computing device-executable instructions for fulfilling an order, the computing device in communication with one or more databases, the one or more databases holding order information and information associated with a plurality of workers, wherein the order information includes data indicating a completion threshold associated with each of the orders,
wherein the information associated with the workers includes data indicating begin task queues of the workers and end task queues of the workers and indicating:
interactions by the workers with the mobile devices of the workers when the workers begin tasks in the task queues of the workers; and
interactions by the workers with the mobile devices of the workers when the workers end the tasks in the task queues of the workers, and
wherein the instructions when executed by the computing device, causing the fulfillment engine to:
calculate, for an order of the plurality orders, the order having a plurality of items, an estimated completion time of the order based on an estimated completion time of item task requirements associated with the plurality of items of the order;

determine, based at least in part on an analysis of the data received via the mobile devices of the workers and indicating the interactions by the workers with the mobile devices of the workers when the workers begin the tasks in the task queues and when the workers end the task queues of the workers, and based at least in part on analysis of time stamps indicating when the workers began the tasks in the task queues and time stamps indicating when the workers ended the tasks in the task queues, a task completion status for each of the workers and an availability status for each of the workers, determines, based on the task completion status and the availability status determined for each of the workers, whether the estimated completion time required for the order meets a completion threshold associated with the order;

obtains, from the one or more databases, the data indicating the completion threshold associated with the order; and assign, when the estimated completion time required for the order meets the completion threshold, one or more item tasks associated with the plurality of items of the order to one or more of the workers.

* * * * *